United States Patent [19]

Phillips et al.

[11] Patent Number: 4,559,834
[45] Date of Patent: Dec. 24, 1985

[54] MULTIPURPOSE FLOWMETER ARRANGEMENT

[75] Inventors: James W. Phillips, Michigan City; Duane M. Kobos, LaPorte, both of Ind.

[73] Assignee: Dwyer Instruments, Inc., Michigan City, Ind.

[21] Appl. No.: 645,680

[22] Filed: Aug. 30, 1984

[51] Int. Cl.$^4$ .............................................. G01F 1/00
[52] U.S. Cl. .................................................. 73/861.55
[58] Field of Search ............ 73/861.55, 861.57, 861.56

[56] References Cited

U.S. PATENT DOCUMENTS

| | | | |
|---|---|---|---|
| 2,258,023 | 10/1941 | McKernon | 73/861.55 |
| 3,342,068 | 9/1967 | Metzger | 73/861.55 |
| 3,416,370 | 12/1968 | Kaucher et al. | 73/861.55 |
| 3,633,421 | 1/1972 | Phillips | 73/209 |
| 3,675,481 | 7/1972 | Phillips | 73/209 |
| 3,691,835 | 9/1972 | Metzger | 73/861.55 |

Primary Examiner—Donald O. Woodiel
Attorney, Agent, or Firm—McWilliams, Mann, Zummer & Sweeney

[57] ABSTRACT

A multipurpose flowmeter arrangement of simplified construction that may be adapted for a number of different flowmeter applications under both pressure and vacuum conditions, in the form of a one-piece molded plastic body defining a float tube, rearwardly projecting tubular mounting studs at the base and top of the float tube that are also to form the fluid connections to and from the float tube, with the flowmeter body also defining both at the base and at the top of the float tube a cylindrical valve chamber, which valve chambers are aligned with the bores of the respective mounting studs and are each defined by a forwardly projecting cylindrical wall that, for use with valve control, may have fixed to same a sleeve that has an internal left hand thread to optionally threadedly receive either a similarly externally threaded plug to seal the valve chamber in question, or a similarly externally threaded nut that has a right hand internal threading for threadedly mounting a similarly externally threaded valve member for opening and closing the valve of the valve chamber it services. The valve member in question carries a stop flange that engages the nut to prevent removal of the valve member, and the valve member threading is proportioned to provide for free wheeling of same when moved to its fully retracted position, but with the nut and valve member being removable as a unit from the flowmeter to accommodate cleaning of the flowmeter or the like.

14 Claims, 11 Drawing Figures

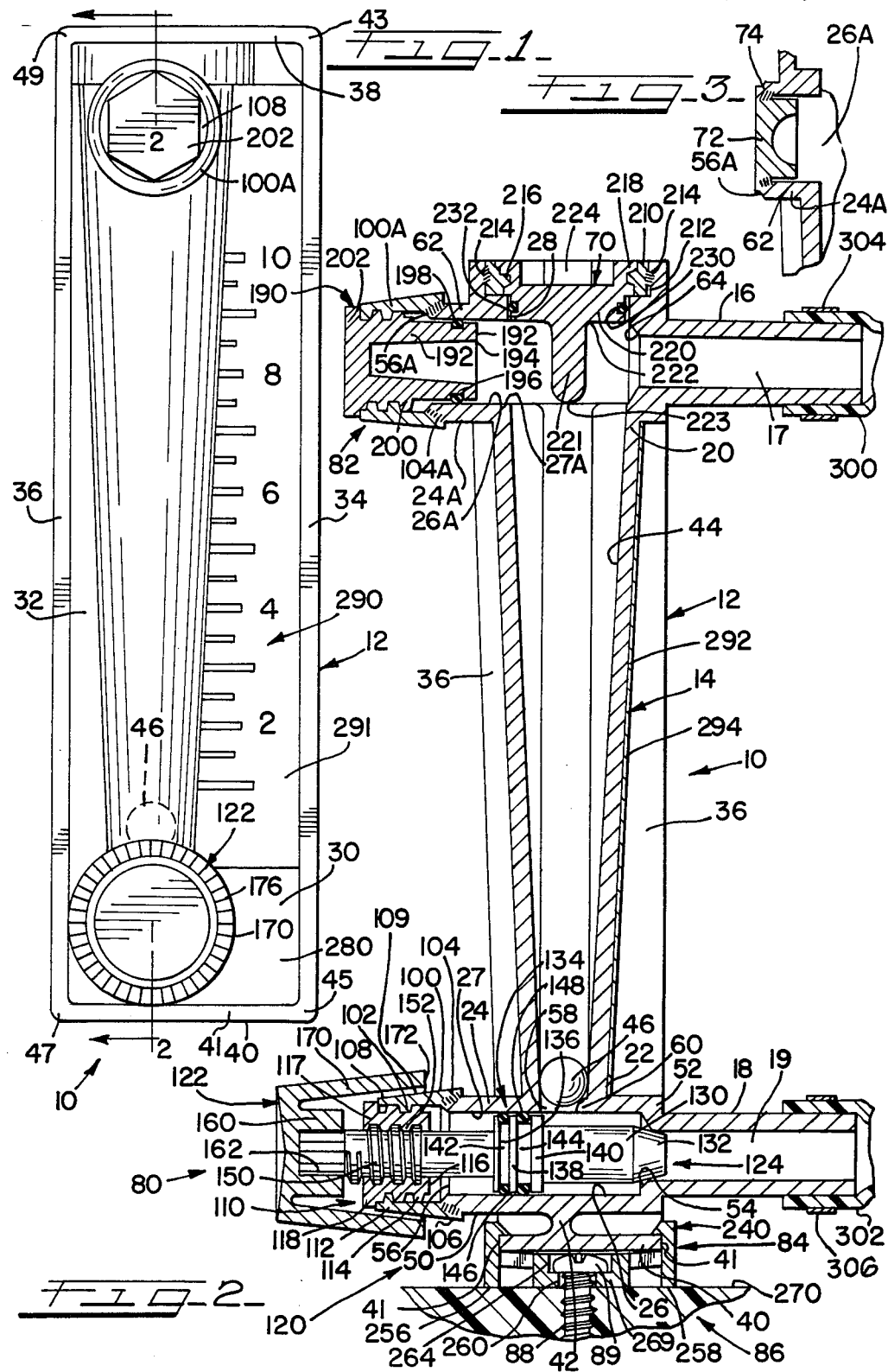

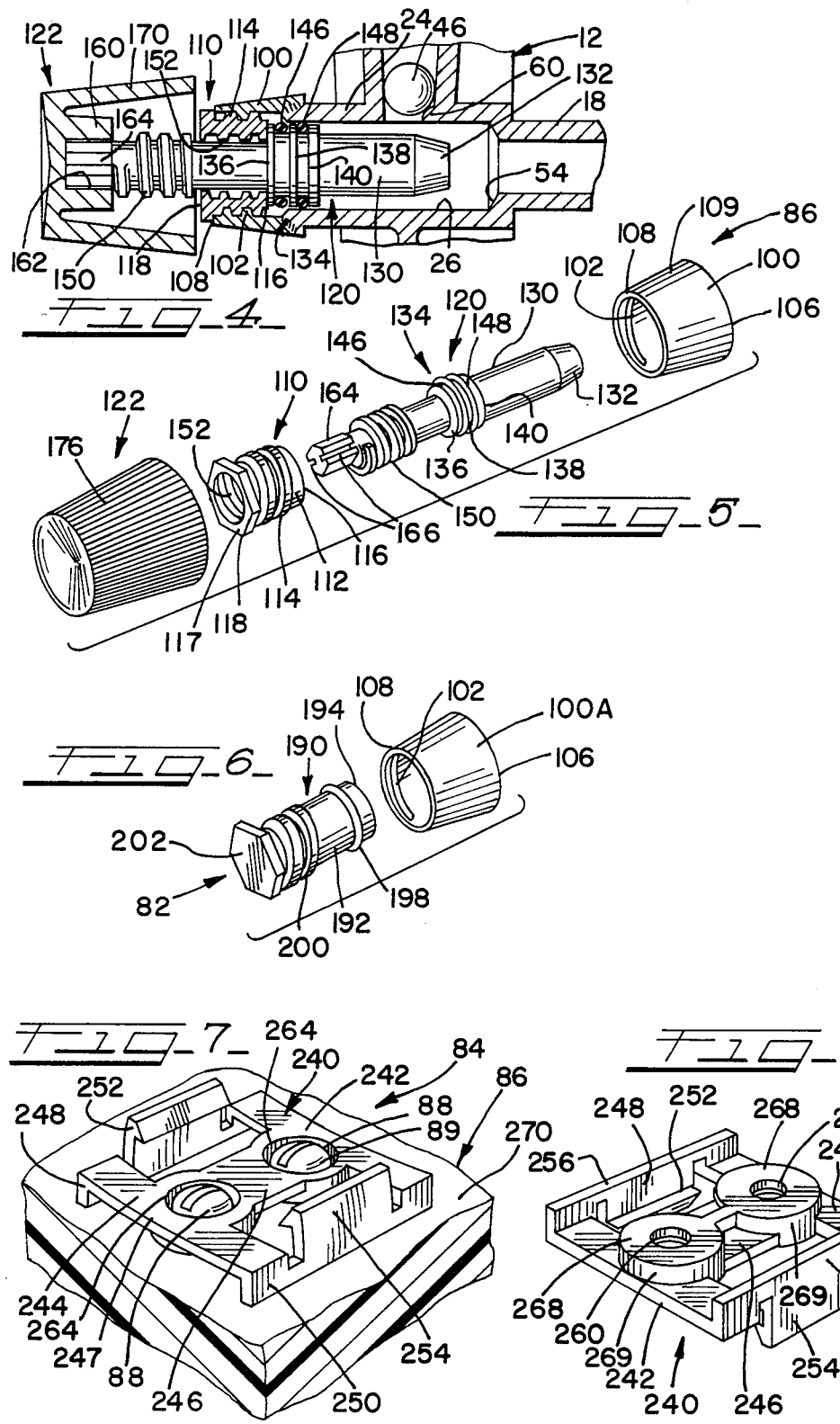

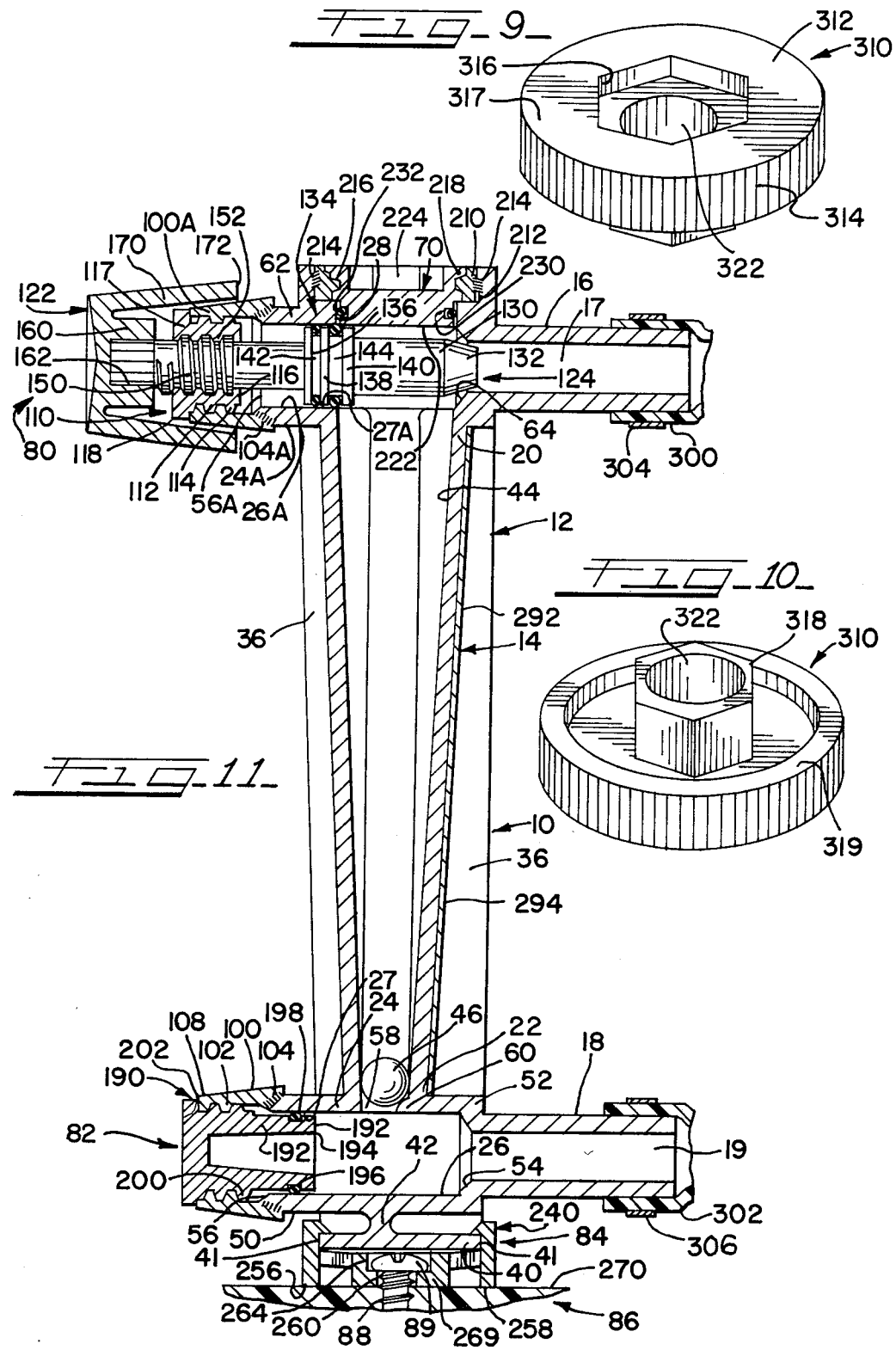

MULTIPURPOSE FLOWMETER ARRANGEMENT

This invention relates to a flowmeter arrangement for measuring and controlling gas and liquid flow, and more particularly, to a flowmeter arrangement that includes a flowmeter body that is of essentially one-piece molded body construction, and further includes valve and plug components for optionally adapting the flowmeter arrangement for both pressure and vacuum applications, and with or without valve control.

Flowmeters are widely used in industry and research to indicate and/or control flow rates of gases including air or flow rates of liquids including water to improve processing and increase the operation efficiency of the equipment involved. This type of instrument is basically a vertical, internally tapered, so called "float" tube mounted with the large end at the top of the instrument and a ball like float or rotor with an outer diameter slightly less than the minimum diameter of the tube, being placed inside the float tube. The clearance space between the float and the float tube internal surfacing forms an annular passage or orifice, and as the float tube is defined by a tapering bore that diverges upwardly, the area of this orifice is larger when the float is near the top of the float tube than when the float is near the bottom of the float tube. By connecting the float tube into a fluid flow line so that the flow direction is from the bottom to the top of the float tube, the float will move upwardly and be supported at a point where the orifice is just large enough to pass the fluid flowing through the system. By making the float tube transparent so that the position of the float can be seen, and by providing a scale alongside same, the float position may be "read" in terms of numbers on the scale that are provided in accordance with standard practices in this field.

The many applications in use of meters of this type, and economy of manufacture and inventorying of same, has suggested to the Applicants the need to provide a basic flowmeter structure and associated parts that permit the user to adapt the flowmeter he is to use to his specific needs for a specific job. However, the need for such a device to be optionally adapted to provide for both pressure and vacuum operation, with or without valve control, and yet permit the needed periodic cleaning of the flowmeter that is commonly required for maximized operating efficiency, as well as provide for adequate protection to the user and/or technician monitoring the same against the adverse effects of corrosive or chemically active gases or liquids that may be involved, has led to tendencies to provide specific flowmeter equipment for specific purposes.

A principal object of this invention is to provide a flowmeter arrangement intended primarily for low pressure gas or liquid flow applications that is of simplified light weight, low cost, design and provides the flowmeter components needed to adapt the flowmeter for pressure or vacuum use or application, and with or without valve control, whereby a specific flowmeter assembly may be made available that is fully operative for original equipment manufacture (OEM), quantity applications, or optionally the flowmeter arrangement may be made available in essentially kit form for assembly by the user in accordance with the user's specific needs and/or requirements for a particular flowmeter application.

Another principal object of the invention is to provide a flowmeter arrangement of the general type indicated in which the flowmeter body that defines the float tube forms base and top valve chambers that are each equipped at the front side of the flowmeter body with an internally threaded sleeve of the same hand of threading that optionally threadedly receives for the valve cylinder involved a valve chamber closing plug or a valve member for opening and closing the valve defined by such valve member and the chamber in question, for adapting the flowmeter for either pressure of vacuum applications, with the valve member provided being seemingly of the non-removable type, but which in fact can be removed, as for flowmeter cleaning purposes, by using a common type wrench tool for that specific purpose, lacking which the valve member cannot be removed from the flowmeter even when withdrawn to its fully opened position.

Yet another principal object of the invention is to provide a valve arrangement for flowmeters in which there is a valve member mounted for threading movement longitudinally of the flowmeter valve chamber for opening and closing the valve defined thereby, with the valve member being proportioned to be in effect locked within the valve chamber against withdrawal, with the threaded mounting of the valve member within the flowmeter being such that in its position of maximum withdrawal from the valve chamber, it remains held against full withdrawal and yet becomes freewheeling, and thus free of its threaded mounting, for avoiding inadvertent stripping of the flowmeter threading that mounts the valve member in the flowmeter to open and close the valve it controls.

Still another object of the invention is to provide a valve mounting arrangement for flowmeters in which the valve member is threadedly mounted in a nut internally threaded, by a thread at one end of the valve member, for movement between valve open and valve closed positions, with the valve member being proportioned to resist withdrawal from the flowmeter valve chamber, and with the valve member mounting nut having a threaded connection with the flowmeter body, about the opposite hand, for threaded removal of the nut and valve member as a unit from the flowmeter, by using a suitable wrench type tool, for cleaning the flowmeter valve chamber or the like, lacking which the valve member is non-removable.

Other important objects of the invention are to provide a simplified, light weight, flowmeter arrangement that is adaptable to both pressure and vacuum applications with or without valve control utilizing parts that are standardized and simplified, in accordance with the invention, and comprise flowmeter components configured and devised to maximize flexibility of application or use and yet be inexpensive of manufacture, simple to adopt to specific applications, easy to clean, safe to operate and monitor, and long lived in operation.

In accordance with a preferred embodiment of the invention, a flowmeter arrangement of miniaturized size and maximized application capability for a wide range of OEM and user applications, as for instance in medical equipment, air samplers, gas analyzers pollution monitors, chemical ejectors, cabinet purging, and the like, is provided that is suitable for either gas and liquid applications and that can be configured or adapted by the assembler of same, with the components or parts provided, to have a non-removable top or bottom front mounted valve, or no valve at all, and for either pressure or vacuum applications.

The flowmeter arrangement includes an elongate body adapted to be disposed in an upright, operative position, relation and defines a float tube having oppositely facing front and rear sides and a tapering bore that diverges upwardly from the float tube base to the top of the float tube, with a suitable float being disposed in the float tube in accordance with standard flowmeter practices. The flowmeter body has a first tubular mounting stud at the base of the float tube and a second tubular mounting stud at the top of the float tube, with such mounting studs projecting rearwardly of the flowmeter body and each defining an outwardly projecting end portion to which the usual tube connections can be made, in accordance with standard flowmeter practices.

The flowmeter body is formed to define a first valve chamber at the base of the float tube that is aligned with the bore of the lower mounting stud and that is defined by a first or lower forwardly projecting cylindrical wall and an inner annular valve seat that are in coaxial relation, with the flowmeter defining at the top of the float tube a second valve chamber that is aligned with the bore of the upper mounting stud, and that is defined by a second, forwardly projecting, substantially cylindrical wall and an inner annular valve seat that are also in coaxial relation.

In one application of the invention, the indicated forwardly projecting cylindrical walls each have secured to same at the front side of the flowmeter and in coaxial relation to such cylindrical walls a mounting sleeve that extends forwardly of the flowmeter body and defines an internal threading of a predetermined hand, such as a left hand thread, with such sleeves being identical in construction and application to the flowmeter body.

As so arranged, the flowmeter arrangement provided can be adapted for pressure or vacuum applications without valving by applying to each of the indicated sleeves a plug component that is externally threaded for this purpose and includes O ring seals for sealing off the valve chamber that is aligned therewith, and at the front of the body, with such plugs being turned into their sealing mounted positions employing a suitable wrench type tool for this purpose, the plug members being provided with a hex head for this purpose, and for ready removal of same should valve control be subsequently desired at one or the other cylinders of the flowmeter arrangement involved.

Where the flowmeter application is to provide for valve control under pressure feed conditions, the indicated plug member is applied to the upper cylindrical wall, while where vacuum operation is desired, the indicated plug member is applied to the lower cylindrical wall.

In each application, the other internally threaded sleeve operably mounts the flowmeter valve member in an essentially non-removable manner, by way of a nut that has external threading compatible with that of the mounting sleeve that mounts same, and internal threading of the opposite hand that threadedly mounts the valve member for flow control operation, but in a manner providing for removal of the nut and valve member as a unit, for purposes of cleaning the flowmeter or the like, by employing a wrench like tool, suitable for this purpose, which is brought into wrenching engagement with a hex head defined by the nut.

The valve member mounting nut thus has internal threading of the hand that is the opposite of the external threading of the nut, with the valve member including a stem portion that is externally threaded with the same hand threading as the internal threading of the nut for threadedly mounting the valve member in projecting relation into and within the valve chamber for controlling the valve defined by same, by way of threading movement of the valve member longitudinally of the valve chamber, using a turning knob with which the valve member is removably equipped and that normally is in overlying relation to the indicated hex head of the nut that threadedly mounts the valve member in place.

The valve member as mounted in the flowmeter is non-removable without removing its turning knob; and on removal of its knob, the valve member and nut are removable as a unit, this arranged for by providing for the valve member to define in a portion of the stem of same that is disposed inwardly of the flow member valve chamber with respect to the nut a stop flange structure that seats against the inner end of the valve member mounting nut when the valve member is threaded to its fully retracted position, in which retracted position the threading of the valve member is disengaged from the internal threading of the nut so that the valve member free wheels with respect to the nut to avoid stripping of the threading involved. This non-removable mounting of the valve member also protects the user or monitoring technician from discharge of the gas or liquid that is controlled by the flowmeter, which can be corrosive or chemically active in nature, from the front of the flowmeter.

As indicated, the flowmeter valve member can be removed from the valve chamber it is mounted in by removing its turning knob and applying to the valve member mounting nut hex head a suitable wrench type tool for threading the nut from the flowmeter body, which removes the nut and valve member as a unit from the flowmeter body, with reapplication being effected by reversing this removal procedure.

The flowmeter valve member stem is preferably equipped with a pair of O ring seals in sealing relation to the cylindrical wall of the valve chamber in which it is mounted for effecting effective sealing action with standard surfacing texture of the internal surfacing of the valve chamber.

The flowmeter arrangement also includes a one piece clip arrangement for removably mounting the flowmeter with its float tube in the normal upright operating relation.

Other objects, uses, and advantages will be obvious or become apparent from a consideration of the following written description and the application drawings in which like reference numerals indicate like parts throughout the several views.

In the drawings:

FIG. 1 is a front elevational view of one flowmeter embodiment in accordance with the invention;

FIG. 2 is a diagrammatic cross-sectional view taken substantially along line 2—2 of FIG. 1, with this view more specifically illustrating the pressure feed valve control option provided by the invention, and the mounting clip operating position forming relation of same;

FIG. 3 is a fragmental view of the front portion of the flowmeter body upper end shown with the valve chamber that is defined by the upper end of the flowmeter body sealed at the forward end of the valve chamber by another option plug arrangement that is permanently fixed in place (as by employing ultrasonic welding), instead of employing the removable plug arrangement of FIGS. 1 and 2;

FIG. 4 is a sectional view similar to that of FIG. 2, at the base of the flowmeter, showing the valve member that is applied to the flowmeter for pressure feed valve control purposes in its free wheeling, fully retracted, but non-removable position;

FIG. 5 is a diagrammatic exploded perspective view of the flowmeter valve member including its stop flange structure and cylinder seals carried thereby, the valve member mounting nut, the mounting sleeve therefor, and the knob that is frictionally applied to the valve member for threading same with respect to the nut for opening and closing the flowmeter valve where this option is employed;

FIG. 6 is a view similar to that of FIG. 5, but illustrating the removable plug arrangement of FIG. 2 in diagrammatic exploded relation including its mounting sleeve, the external threading and O ring seal of same, and its hex head for rigid application to and from the flowmeter body;

FIG. 7 is a diagrammatic perspective view of the flowmeter body mounting clip shown in FIG. 2, showing the upper side of same, and with the mounting clip shown mounted in a flowmeter holding position, but with the flowmeter removed therefrom;

FIG. 8 is a perspective view of the flowmeter body mounting clip as viewed from the underside of same;

FIGS. 9 and 10 are diagrammatic perspectives of an installation key that may be utilized to perform the wrench functions described hereinafter with regard to assembly and disassembly of flowmeters in accordance with the invention; and FIG. 11 is similar to that of FIG. 2, but illustrating the flowmeter arranged vacuum operation with valve control.

However, it is to be understood that the specific drawing illustrations provided are supplied to comply with the requirements of the Patent Laws, and that the invention is susceptible to modifications and variations that will be obvious to those skilled in the art, and that are intended to be covered by the appended claims.

GENERAL DESCRIPTION

Reference numeral 10 of FIGS. 1 and 2 generally indicates a preferred embodiment of the invention comprising a body 12 of one-piece molded plastic construction, that is preferably formed employing suitable injection molding procedures using nylon 12, a polyamid plastic material offered under the trademark GRILAMID by Emser Industries Inc., Sumter, S.C. While this material is preferred because it provides high resistance to chemical action or corrosion, low moisture absorption, and is transparent to facilitate routine inspection, other equivalent materials will be satisfactory.

The body 12, similar to the flowmeter arrangement of Phillips U.S. Pat. No. 3,633,421, granted Jan. 11, 1972, is of one piece molded construction, and includes float tube 14, a tubular mounting stud 16 at the float tube top 20, a cylinder 24 forming valve chamber 26 at the float tube base 22, and also a tubular mounting stud 18 adjacent the base 22 of the float tube.

Extending laterally from either side of the float tube 14 are the webs 30 and 32, and projecting forwardly and rearwardly of the webs 30 and 32 are side flanges 34 and 36, top flange 38 and bottom flange 40, with the side flanges 34 and 36 merging into the respective top and bottom flanges 38 and 40 at the respective corners 43, 45, 47 and 49 of the body 12. The lower end or base 22 of the float tube 14 is integral with cylinder 24 that is interposed between the side webs 30 and 32 that merge together as at 42 underneath the cylinder 24.

The float tube 14, as is conventional, defines a tapering, upwardly diverging, bore 44 in which is mounted the conventional ball type float 46. The bore 44 in practice is formed by a tapered core pin (of the molding arrangement in which the body 12 is formed), which projects through and forms the opening 28 at the top of the body 12.

In accordance with the present invention, the cylinder 24 is defined by a cylindrical wall 50 that is an integral part of the body 12 and that is in coaxial relation with stud 18. Stud 18 is integral with the wall 50 as at 52, and defines frustoconical valve seat 54 that is also in coaxial relation with cylindrical wall 50 and stud 18. The cylindrical wall 50 defines a forwardly facing opening 56 and a port 58 that provides communication between the valve chamber 26 and the float tube bore 44. The port 58 is suitably shaped so as to define one or more dimples or ledges 60 that preclude the float 46 from dropping through the port 58 into the chamber 26.

Further in accordance with the invention, the body 12 at its top 20 defines an additional cylinder 24A that forms cylindrical chamber 26A, with the cylinder 24A being defined by cylindrical wall 62 that is in coaxial relation with the mounting stud 16. Wall 62 defines forwardly facing opening 56A. The body 12 is formed to define frustoconical valve surface 64 that is also in coaxial relation with the mounting stud 16. Mounting studs 16 and 18 project in parallelism rearwardly of the body 12, as is apparent from the showing of FIG. 2.

The bore 17 of the mounting stud 16 communicates with the bore 44 of float tube by way of cylinder 24A, while the bore 19 of the mounting stud 18 communicates with bore 44 of the float tube by way of the cylinder 26 and port 58. The top opening 28 of the body 12 is closed by cap 70 that will be further described hereinafter.

A basic aspect of the present invention is to provide in a compact miniaturized flowmeter of the general type disclosed in said Phillips U.S. Pat. No. 3,633,421 a flowmeter arrangement and associated parts that permits the flowmeter to be supplied or offered in two basic configurations or embodiments, namely fully assembled for specific OEM quantity applications, or supplied or made available as a kit including the body 12 and necessary option forming components to allow the user of the flowmeter to assemble same in one of the three options that are made available by this invention for field assembly. In accordance with the invention, the flowmeter arrangement 10 thus may be supplied fully assembled in configurations as agreed upon for specific OEM quantity applications, or in kit form for assembly by the user functioning under pressure or vacuum conditions without valve control, for functioning under pressure conditions with valve control, and for functioning under vacuum conditions with valve control. As assembled for specific OEM quantity applications, the flowmeter so supplied may be, of course, in any one of these configurations.

For these purposes, where the flowmeter as it is to be used is to not provide for valve operation, both the cylinders 24 and 24A may be permanently closed at their forward ends 56 and 56A in the manner indicated in FIG. 3 for cylinder 24A, which involves ultrasonically welding permanent plug plastic discs 72 across the respective cylinder openings 56 and 56A, with the weld being 360 degrees thereabout, as where indicated at 74 in FIG. 3; alternately, both cylinders 24 and 24A are each equipped with a removable plug assembly or device 82 (see FIGS. 2 and 6).

Where the flowmeter arrangement is to be employed under pressure conditions with valve control, the arrangements specifically illustrated in FIG. 2 may be employed, in which the lower cylinder 24 is equipped with a non-removable valve assembly or device 80, and the upper cylinder 24A is equipped with removable plug assembly or device 82, or alternately the cylinder open end 56A is permanently sealed off in the manner indicated in FIG. 3.

Where the flowmeter device 10 is to be employed under vacuum conditions with valve control, the ball stop of plug 70 is removed (as disclosed hereinafter); the valve assembly or device 80 is applied to cylinder 24A, and the plug assembly or device 82 is applied to the cylinder 24, or alternately the open end 56 of the cylinder 24 is closed permanently in the manner indicated in FIG. 3.

In addition, the body 12, in accordance with the invention, is mounted in its normal upright operative position by applying to the body 12 the supporting clip device 84 that is suitably affixed to a suitable mounting base 86, as by employing body screws 88, as will be described in detail hereinafter.

SPECIFIC DESCRIPTION

The valve assembly or device 80 is shown in exploded diagrammatically illustrated relation in FIG. 5 in associating with its mounting sleeve 100, the latter is internally threaded as at 102 so as to define, in the preferred embodiment, internal threading of the left hand direction, as compared to the normal right hand threading that is customarily employed for threaded connections. As indicated in FIG. 2, the mounting sleeve 100 is fixed about the cylinder open end 56, as by ultrasonically welding same 360 degrees thereabout, where indicated at 104, such that the rear end 106 of the sleeve 100 is fixed to the cylinder 24, and the sleeve 100 itself and its forward or front end 108 projects forwardly of the cylinder 24, as indicated in FIG. 2.

Threadedly mounted in the sleeve 100 is nut 110 of device 80, which comprises sleeve 112 that bears external threading 114 that is also of left hand configuration and shaped for counterclockwise motion threading into the sleeve threading 102. The sleeve 112 has an inner cylindrical end 116 and an end 117 defining a hex shaped flange or wall 118 (that is centered on nut 110) which is preferably proportioned to be received in a conventional wrench of a commonly available or standard size size. Nut 110 is threaded into the threading 102 of the sleeve 100, using the left hand threading action involved, and is preferably tightened against the end 108 of sleeve 100 such that the hex end wall 118 of the nut 110 bears firmly against sleeve 108 and the threadings 102 and 114 are firmly engaged.

Prior to application of the nut 110 to the sleeve 100, the nut 110 has applied to same valve member 120 that in accordance with the present invention is to be mounted in the nut 110 for threaded movement toward and away the valve seat 54 when these components are operably associated with cylinder 26, with the threading action to be of the opposite hand from that employed for the threaded connection between nut 110 and sleeve 100. Knob 122 is removably keyed to valve member 120 to permit the flowmeter user to conveniently turn the valve member 120 in the direction desired for opening and closing of the valve 124 defined by the valve member 120 and valve seat 54, as will now be described in detail.

The valve member 120 comprises a spindle or valve stem 130 having its inner end 132 of appropriate frustoconical configuration for valve closing cooperation with the valve seat 54 in the manner indicated in FIG. 2. The valve stem 130 includes flange portion or structure 134 in the form of radially extending ribs 136, 138 and 140 that are spaced apart to define the respective grooves 142 and 144 in which suitable O ring seals 146 and 148 are seated for fluid tight sealing action with the internal surfacing 27 of the cylinder 26, as indicated in FIG. 2.

The valve stem 130 also includes external threading 150 that is spaced outwardly of, and stops well short of, the flange structure 134, and which has a right hand threading configuration for clockwise motion threading into internal threading 152 of nut 110 that thus is also of a complementary right hand thread and receives in the usual complementary manner the threading 150 of the valve stem 130 for threadedly mounting the valve member 120 in nut 110 for the valve opening and closing movement that has been indicated.

It has been noted, in this connection, that the external threading 150 of the valve stem 130 is to terminate well short of the valve stem flange structure 134. It is a feature of the present invention that when the valve member 120 is turned from the fully valve closed position of FIG. 2 to the fully valve open position of FIG. 4, the valve stem threading 150 is freed from and is disposed exteriorily of the internal threading 152 of the nut 110 and also the flange structure 134 is disposed adjacent or seats against the inner end 116 of nut 110 (as mounted in the sleeve 100) to prevent removal or withdrawal of the valve member 120 from the flowmeter, free of the nut 110.

Knob 122 comprises hub portion 160 defining a hex shaped socket 162 which is proportioned to frictionally receive the hex shaped stub end 164 of the valve stem 130 that is slotted as at 166 (see FIG. 5) as at 166 for resilient lateral deflection for easy frictional fit of the stub end 164 in and within the knob socket 162. The knob 122 includes an integral encompassing flange 170 that is of frustoconical configuration and open at its end 172 to overlie a major portion of the nut mounting sleeve 100 when the valve device 80 is turned to its fully valve closed position of FIG. 2. For convenience of fit, the external surfacing 109 of the sleeve 100 and the knob flange 170 are of complementary frustoconical configuration, as indicated in FIG. 2.

In applying the valve assembly or device 80 to the cylinder 24, assuming the sleeve 100 is fixed in place on the open end 56 of the cylinder 26 in the manner aforedescribed and as indicated in FIGS. 2 and 4, valve member 120 is threaded into the nut 110, so that the external threading 150 is in threaded relation with the internal threading 152 of the nut 110, and the valve stem 130 is inserted into the sleeve 100 (spindle end 132 first) and passed into cylinder 24 to bring the external threading 114 of the nut 110 into threaded engagement with the threading 102 of the sleeve 100, whereupon the nut 110 is firmly threaded into sleeve 100 to firmly seat its hex flange 118 against the end 108 of sleeve 100 (the latter being effected by using a suitable wrench type tool applied to hex flange 118).

On applying the knob 122 to the valve stem 130 so that the hex stub end 164 of the valve stem 130 is fully seated in the hex socket 162 of the knob 122, the knob 122 may be rotated to turn the valve member 120 in the appropriate threaded directions for movement of the valve member 120 between valve open and valve closed positions. For this purpose, the external surfacing of the knob 122 may be knurled as indicated at 176 in FIG. 5. The valve fully closed position of the valve device 80 is shown in FIG. 2 while the fully open position of the valve device 80 is shown in FIG. 4. As indicated, in the fully valve open position, the valve member 120 is moved forwardly sufficiently (of the flowmeter) so that its threading 150 is separated from the nut internal threading 152, whereby the valve member 120 will free wheel relative to cylinder 24 and nut 110 on being rotated, with full withdrawal of the valve member 120 from the flowmeter being prevented by the engagement of the flange structure 134 with the inner end 116 of the nut 110.

The plug assembly or device 82 is diagrammatically illustrated in FIG. 6 in association with a mounting sleeve 100A that is identical to the sleeve 100 of FIGS. 2, 4 and 5, as indicated by corresponding reference numerals. Sleeve 100A is affixed to the open end 56A of the cylinder 24A, as by suitably ultrasonically welding same in place 360 degrees thereabout, where indicated at 104A, and thus is secured to body 12 in the same manner as sleeve 100.

Operably associated with the sleeve 100A is plug member 190 that comprises a stem 192 that is suitably grooved thereabout adjacent its inner or rear end 194, to define an angular groove 196 in which is seated a suitable O ring seal 198 that is proportioned to be in sealing relation with the internal surfacing 27A of cylinder 24A when received therein, as indicated in FIG. 2. The stem 192 is further formed to define external threading 200 that is of the same hand as and is proportioned for complement fit relation with, sleeve threading 102, and which is thus of the left hand, and a hex shaped end flange 202 that is similar in configuration and dimension to the hex end 118 of the nut 110, except that it is imperforate at the mid portion of same, as indicated in FIG. 2.

With the sleeve 100A fixed to the open end 56A of the flowmeter upper cylinder 24A, and the O ring seal 198 seated in its recess 196, the plug device 82 is applied in removable plugging relation to the cylinder 24A by turning the plug stem 190 in the left hand threaded or counterclockwise direction relative to the sleeve 100A to firmly seat the hex end flange 202 against the end 108 of the indicated sleeve 100A (the latter being effected by using a suitable wrench type tool applied to hex flange 202).

In the illustrated embodiment, the cap or plug 70 closes the top opening 28 of the body 12. For this purpose, body 12 is counterbored as at 212 about the opening 28 to receive a ring 210 that is ultrasonically welded in place, as indicated at 214, 360 degrees thereabout, and is formed with suitable threading 216 that threadedly receives corresponding threading 218 defined by plug 70. Plug 70 also defines short stem portion 220 having an annular planar surface 222 that is to be in substantially tangent relation with the cylinder internal surfacing 27A in the secured relation of the plug 70 with respect to the body 12, as indicated in FIG. 2. The plug includes depending ball stop 221 of the type shown in Phillips U.S. Pat. No. 3,633,421, to prevent float 46 from entering the top cylinder 24A when the body 12 is arranged for use with no valve control or with valve control under pressure conditions; the depending end 223 of stop 221 is preferably tangent with cylinder surfacing 27A. Plug 70 is also preferably formed with a hex shaped socket 224 to receive an appropriate commonly available turning tool of an appropriate complementary size to tighten the plug 70 into operating position. The plug stem 220 is formed to define annular groove 230 receiving conventional O ring seal 232 that is in sealing relation to the opening 28.

The flowmeter mounting clip 84 is also of molded plastic construction and comprises a one-piece frame structure 240 of generally H shaped configuration in plan comprising spaced parallel leg portions 242 and 244 that are innerconnected by a bridge portion 246. The leg portions 242 and 244 at their opposed ends are integral with crosswise, laterally extending, and similarly proportioned side walls 248 and 250 that are disposed in substantial parallelism. The frame leg portions 242 and 244 are coplanar related in a plane that extends normally of the respective flange portions 248 and 250, with the latter having upstanding centrally located end portions 252 and 254 that are of identical but opposite hooked relation or configuration, as indicated in FIGS. 2 and 7, for snap fitted hooking over the flowmeter body bottom flange side edges 41, as indicated in FIG. 2.

The clip cross wall or flange portions 248 and 250 define seating surfaces 256 and 258 that are in coplanar relation in a plane that parallels the plane of framework 240. The bridge portion 246 is formed to define a pair of screw receiving apertures 260, that receive the respective securement screws 88, as indicated in FIGS. 2 and 7. In the specific embodiment illustrated, the bridge portion 246 on its upwardly facing side 247 (see FIG. 7) is counterbored as at 264 to receive the heads 89 of the respective screws 88, and the bridge portion 246 is thickened or extended somewhat laterally of the plane of the framework 240, as indicated at 268, and in the direction of the seating surfaces 256 and 258, but short of the plane of same a fraction of an inch, say a dimension on the order of 0.009 to 0.011 inch. The bridge portion extensions 268 define washer like portions 269.

The clip device 84 in use is first mounted on a suitable base or other support 86, which may be in the form of a block of molded plastic material, metal, wood, or the like, defining an upstanding planar mounting surface 270 on which the clip surfaces 256 and 258 are seated to dispose the frame 240 in substantially parallel relation with the plane of the surface 270. Appropriate holes are drilled in the mounting block 86 where it is desired to mount the flowmeter, and the screws 88 are applied thereto and turned so as to seat the end washer portions 269 of the bridge extensions 268 against the mounting surface 270, which deflects the framework 240 downwardly along its mid portion and angles the clip forming edges 252 and 254 toward each other for ready snap fit receiving and holding action on the flowmeter rearwardly and forwardly facing edges 41 of bottom flange 40, as indicated in FIG. 2.

The forwardly facing side 280 of the flowmeter body web 30 preferably has applied thereto a suitable scale where indicated at 290, which may be calibrated in any conventional manner suitable for flowmeter readout and may have the readout indicia involved applied to body 12 in any convenient manner; in the form illustrated the scale indicia is suitably imprinted on an aluminum strip 291 suitably adhered to web 30. The rearwardly facing side 292 of the float tube 14 is preferably covered with a pressure sensitive white vinyl tape 294 for improved observation of the float 46, as suggested by said Phillips U.S. Pat. No. 3,633,421.

With the flowmeter 10 suitably mounted, as by securing same to a suitable base 86 employing the clip device 84, or applying the flowmeter body 12 to a panel of gas mixing and other multiflow devices by having the studs 16 and 18 inserted through appropriately spaced holes formed in the panel, flexible hoses 300 and 302 are suitably applied to the rear ends of the studs 16 and 18, which may be clamped in place employing suitable clamp devices 304 thereto, in an acceptable flowmeter installation manner in accordance with standard practices. The flowmeter 10 arranged as shown in FIGS. 2 and 4 is then mounted for operation under pressure conditions with valve control, with the valve assembly or device 80 being manually set to open the valve 124 as needed to permit the pressure flow rate desired.

Should it be desired to use the flowmeter 10 in vacuum operation with valve control, the ball stop 221 of plug 70 is removed (to within about one thirty-second inch of surface 222; the valve assembly or device 80 is applied to the cylinder 24A in the same manner as illustrated and described in connection with the cylinder 24 (see FIG. 11), and the removable plug assembly or device 82 is applied to the cylinder 24 in the same manner as illustrated and described in connection with the cylinder 24A (see FIG. 11). As indicated, the sleeves 100 and 100A are identical and are permanently mounted on the forward facing ends of the cylinders 24 and 24A. Once the ball stop 221 of a particular plug 70 has been removed for vacuum operation of the flowmeter 10, the same flowmeter 10 cannot be changed back to use under pressure conditions without another plug 70, equipped with a ball stop 221, applied thereto in place of the trimmed plug 70, to prevent the float 46 from entering the cylinder 24A under pressure operating conditions (or where no valve control is employed), in which case the flowmeter may be returned to the option of FIG. 2.

The hex shaped flanges or ends of the nut 110 and the plug member 190 are of the same shape and dimension for application thereto of a conventional wrench of the same size for applying and removing same.

As indicated, the valve assembly or device 80 involves the valve member 120 that for all practical purposes is non-removably mounted in its cylinder 24, but on removing knob 122, and applying the indicated suitable wrench to the nut hex shaped flange or end wall 118, nut 110 may be removed from its mounting sleeve 100 or 100A to permit withdrawal of the valve member 120 from the flowmeter cylinder in which it is mounted, for purposes of cleaning the flowmeter or the like, after which it may be replaced by reversing the operation involved.

As indicated, the flowmeter body 12, permanent plugs 72, mounting sleeves 100 and 100A, nut 110, valve member 120, knob 122, and plug member 190, as well as plug 70 and its seating ring 210, are all preferably formed from the same plastic material, such as a preferred nylon 12 that has been indicated, which material is transparent in nature. The knob 122 is preferably dyed a dark color, such as black, for readily distinguishing it from the other components of the flowmeter.

The O ring seals disclosed are formed from any suitable material, such as the Buna-N elastomeric rubberlike compound.

The float 46 may be formed from stainless steel, black glass, K-monel, tungsten carbide, or the like, or any other suitable material.

In what is now considered the best mode for the practice of the invention, an installation key 310 (see FIGS. 9 and 10) is employed to provide the wrenching functions required as described for nut hex flange 118, plug device hex flange 202, and socket 224 of plug 70. The key 310 is of one piece construction defining a disc 312 having knurlled edging 314 thereabout, hex socket 316 on one 317 side of same that fits for complementary fit, wrench acting purposes both hex flanges 118 and 202 and hex stud 318 on the other side 319 of same that seats for complementary fit wrench acting purposes in socket 224 of plug 70; key 310 has a through cylindrical aperture or opening 322 centered on socket 316 and stud 318 to pass the threading 150 of valve stem 130 therethrough so as to fit on the hex flange 118 of nut 110 when nut 110 is to be removed or applied to sleeve 100. Key 310 is also formed from the preferred nylon 12 material. Key 310 is preferably dyed black to make it distinguishable from the other parts.

In the commercial embodiment of the invention, the body 12 measures 3¾ inches in height and 1 inch in width, and the central axes of the clyinders 24 and 24A are on centers 3 inches apart. The mounting studs have a 5/16th inch outer diameter for push on tubing, push on tubing with a clamp arrangement, or compression union type fittings with appropriate hoses 300 and 302 that may be formed by flexible rubber or plastic tubing. The pressure rating of the flowmeter is 100 psi. maximum, with fittings 304 and 306 of a compression type anchoring the hoses 300 and 302 to the respective studs 16 and 18. The pressure rating with tubing clamps securing hoses 300 and 302 in place is 50 psi (fittings 304 and 306 are not to be confused with the conventional spring retainers (not shown) that are applied to studs 16 and 18 to secure the flowmeter to a vertical panel). The operating air temperature ambient to device 10 should not exceed 130 degrees F. (54 degrees C.).

It will therefore be seen that the invention provides a flowmeter arrangement in which the basic component parts comprising the body 12, plugs 70 and 72, mounting sleeves 100 and 100A, nut 110, valve member 120, and plug member 190, as well as knob 122, key 310, and clip 84, may all be formed from the same material and this is preferably done using a one shot molding operation in a common mold. The result is that the flowmeter 10 may be assembled according to any desired specification for OEM quantity applications, or alternately kits including all of the indicated flowmeter components involved may be made available to allow assembly by the user of the desired flowmeter configuration.

Where the valve device 80 is employed, the valve member 120 is essentially non-removable, which thus protects the user of the device from accidental discharge of fluids that may be corrosive or chemically active in nature. Should it be desired to actually remove the valve member 120 for any reason after the sources of the fluids are shut off, the instrument is disconnected from the sources of fluids involved, and after removal of the knob 122, a suitable wrench type tool or key 310 may be applied to the hex flange 118 of nut 110 to remove same and the valve member 120 as a unit from the flowmeter body 12. Plug device 82 is removable in a similar manner.

The only maintenance required for the device 10, when mounted for operational use, is occasional cleaning to insure proper operation and good float visibility. On removal of the valve member 80, plug 70, plug device 82 and float 46 for cleaning purposes, the flowmeter body and other parts can be washed in mild soap and water solution. Care should be taken to prevent loss of the float 46. A cotton swab or soft bristle bottle brush will be useful when cleaning the float tube 44 and the connections to same. On reassembly it is advisable to coat the O-ring seals and the threading of the valve member 120 with silicone stop cock grease or petroleum jelly. Key 310 may be conveniently employed for disassembly and reassembly purposes.

The foregoing description and the drawings are given merely to explain and illustrate the invention and the invention is not to be limited thereto, except insofar as the appended claims are so limited, since those skilled in the art who have the disclosure before them will be able to made modifications and variations therein without departing from the scope of the invention.

We claim:

1. In a flowmeter that includes an elongate body adapted to be disposed in an upright operative position relation and defining a float tube having oppositely facing front and rear sides and a tapering bore that diverges upwardly from the float tube base to the top of the float tube, a float in said float tube with the body having a first tubular mounting stud at the base of the float tube and a second tubular mounting stud at the top of the float tube, said mounting studs projecting rearwardly of said body and each defining a bore and an outwardly projecting end portion, the improvement wherein:

said body defines a first valve chamber at the base of said float tube that is aligned with the bore of the first mounting stud and that is defined by a first substantially cylindrical wall and an annular valve seat that are in coaxial relation, with said first cylindrical wall extending forwardly at said body and defining a passage aligned with said float tube bore for fluid flow communication with same, said body further defining a second valve chamber at the top of the float tube that is aligned with the bore of the second mounting stud and is defined by a second substantially cylindrical wall and an annular valve seat that are in coaxial relation, with said second cylindrical wall extending forwardly of said body, one of said cylindrical walls have secured to same at the front side of same and in coaxial relation thereto a sleeve that extends forwardly of said body and defines an internal thread of a predetermined hand, with the other of said cylindrical walls receiving a plug including means for sealing off the valve chamber aligned therewith at the front of said body, and said sleeve threadedly receiving a nut having an internal threading of the hand that is opposite that of said predetermined hand, and including a valve member threadedly received in said nut and including a valve stem projecting into the valve chamber defined by said one cylindrical wall and mounted for threaded movement toward and away from the annular valve seat defined by same for opening and closing the valve defined thereby, said valve member having a stop flange disposed rearwardly of said nut for precluding removal of said valve member from said nut, and means for threadedly moving said valve member relative to said nut to open and close said valve.

2. The improvement set forth in claim 1 wherein:

said valve member rearwardly of said stop flange includes O-ring seal means in sealing relation to the cylindrical wall to which said other sleeve is secured.

3. The improvement set forth in claim 2 wherein:

said seal means of said plug is O-ring seal means in sealing relation to said one cylindrical wall.

4. The improvement set forth in claim 1 including:

knob means keyed to said valve member and comprising said means for threadedly moving same relative to said nut.

5. The improvement set forth in claim 1 wherein:

said valve member defines external threading in threaded relation to said nut internal threading, said valve member external threading having a length axially of said valve member that extends rearwardly of said valve member short of said stop flange a sufficient distance such that said valve member may be threaded forwardly of said nut to unthreaded relation with said nut for free wheeling relation to said nut.

6. The improvement set forth in claim 1 including:

means for unthreading said nut from said other sleeve for removing said valve member from the valve chamber defined by said one cylindrical wall.

7. The improvement set forth in claim 1 including:

clip means for mounting said body in its operative position, said body including forwardly and rearwardly extending flanges adjacent the base thereof, said clip means including means for resiliently gripping said flanges.

8. In a flowmeter that includes an elongate body adapted to be disposed in an upright operative position relation and defining a float tube having oppositely facing front and rear sides and a tapering bore that diverges upwardly from the float tube base to the top of the float tube, a float in said float tube, with the body having a first tubular mounting stud at the base of the float tube and a second tubular mounting stud at the top of the float tube, said mounting studs projecting rearwardly of said body and each defining a bore and an outwardly projecting end portion, the improvement wherein:

said body defines:

a first valve chamber at the base of said float tube that is aligned with the bore of the first mounting stud and that is defined by a first substantially cylindrical wall and an annular valve seat that are in coaxial relation, with said first cylindrical wall extending forwardly at said body and defining a passage aligned with said float tube bore for fluid flow communication with same, said body further defining a second valve chamber at the top of the float tube that is aligned with the bore of the second mounting stud and is defined by a second substantially cylindrical wall and an annular valve seat that are in coaxial relation, with said second cylindrical wall extending forwardly of said body, said cylindrical walls each having secured to same at the front side of same and in coaxial relation to the respective cylindrical walls a sleeve that extends forwardly of said body and defines an internal threading of a predetermined hand, one of said sleeves threadedly receiving a plug including means for sealing off the valve chamber aligned therewith at the front of said body, and the other of said sleeves threadedly receiving a nut having an internal threading of the hand that is opposite that of said predetermined hand, and including a valve member threadedly received in said nut and including a valve stem projecting into the valve chamber defined by the cylindrical wall to which said other sleeve is secured and mounted for threaded movement toward and away from the annular valve seat defined by same for opening and closing the valve defined thereby, said valve member having a stop flange disposed rearwardly of said nut for precluding removal of said valve chamber from said nut on threading of said valve member forwardly of the body, and means for threadedly moving said valve member relative to said nut to open and close said valve.

9. The improvement set forth in claim 8 wherein:

said valve member rearwardly of said stop flange includes O-ring seal means in sealing relation to the cylindrical wall to which said other sleeve is secured.

10. The improvement set forth in claim 9 wherein:

said seal means of said plug is O-ring seal means in sealing relation to the cylindrical wall to which said one sleeve is secured.

11. The improvement set forth in claim 8 including:

knob means keyed to said valve member and comprising said means for threadedly moving same relative to said nut.

12. The improvement set forth in claim 8 wherein:

said valve member defines external threading in threaded relation to said nut internal threading, said valve member external threading having a length axially of said valve member that extends rearwardly of said valve members short of said stop flange a sufficient distance such that said valve member may be threaded forwardly of said nut to unthreaded relation with said nut for free wheeling relation to said nut.

13. The improvement set forth in claim 8 including:

means for unthreading said nut from said other sleeve for removing said valve member from the valve chamber defined by the cylindrical wall to which said other sleeve is secured.

14. The improvement set forth in claim 8 including:

clip means for mounting said body in its operative position, said body including forwardly and rearwardly extending flanges adjacent the base thereof, said clip means including means for resiliently gripping said flanges.

* * * * *